Nov. 1, 1938.    L. C. McCLANAHAN ET AL    2,134,724
HEATING AND COOLING SYSTEM FOR VEHICLES
Filed Feb. 29, 1936    3 Sheets-Sheet 1
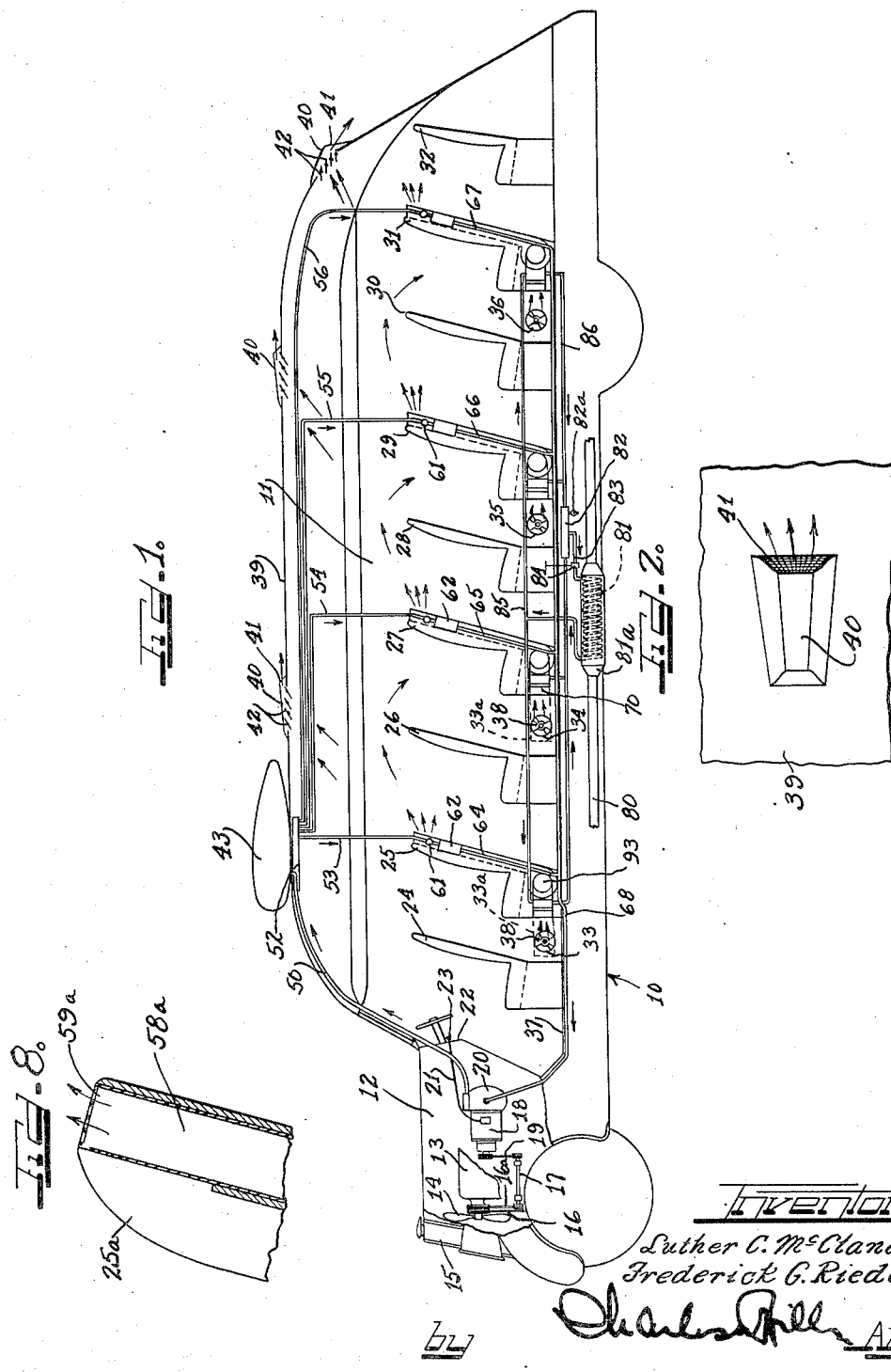
Inventors
Luther C. McClanahan.
Frederick G. Riedel.

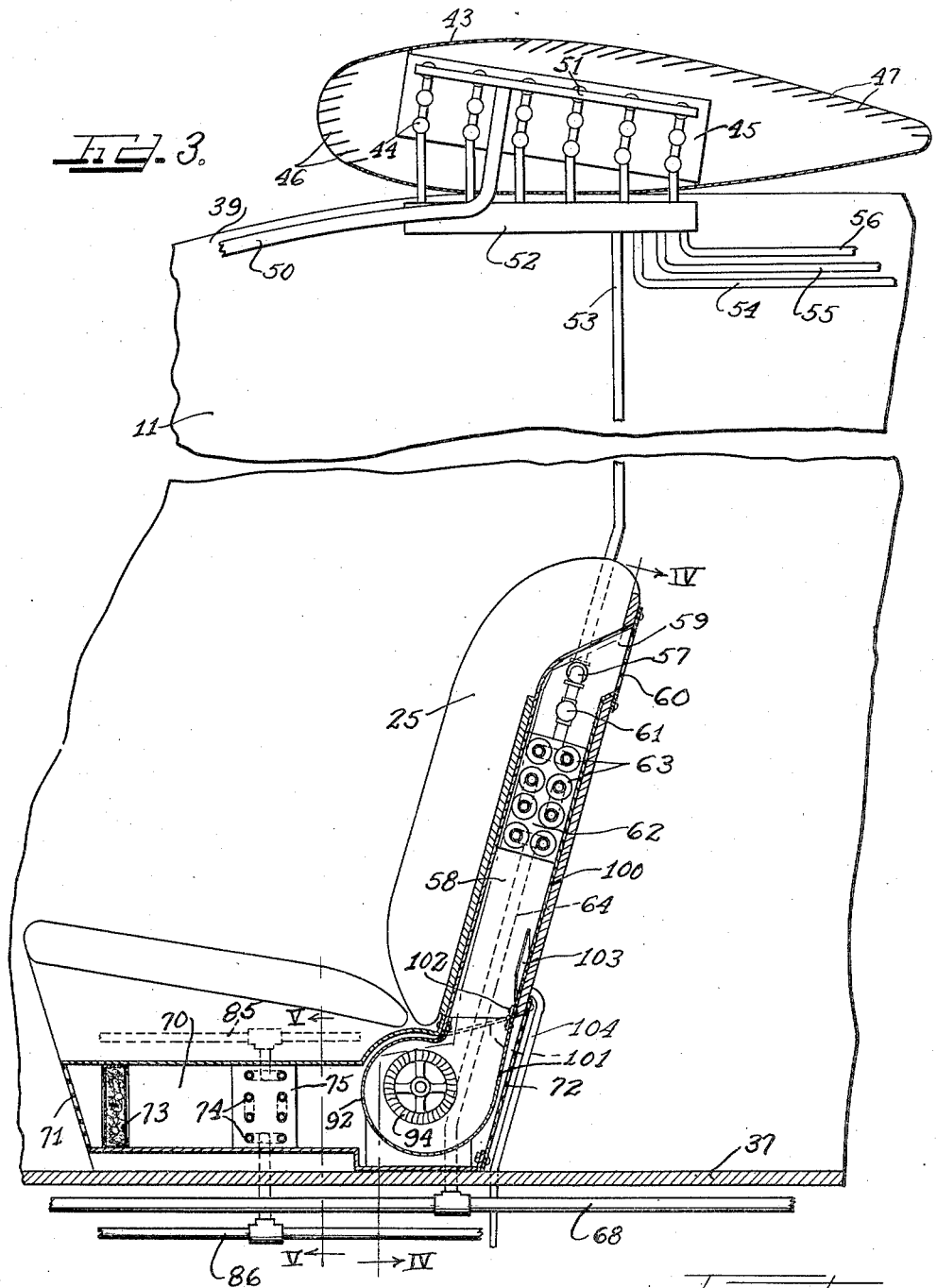

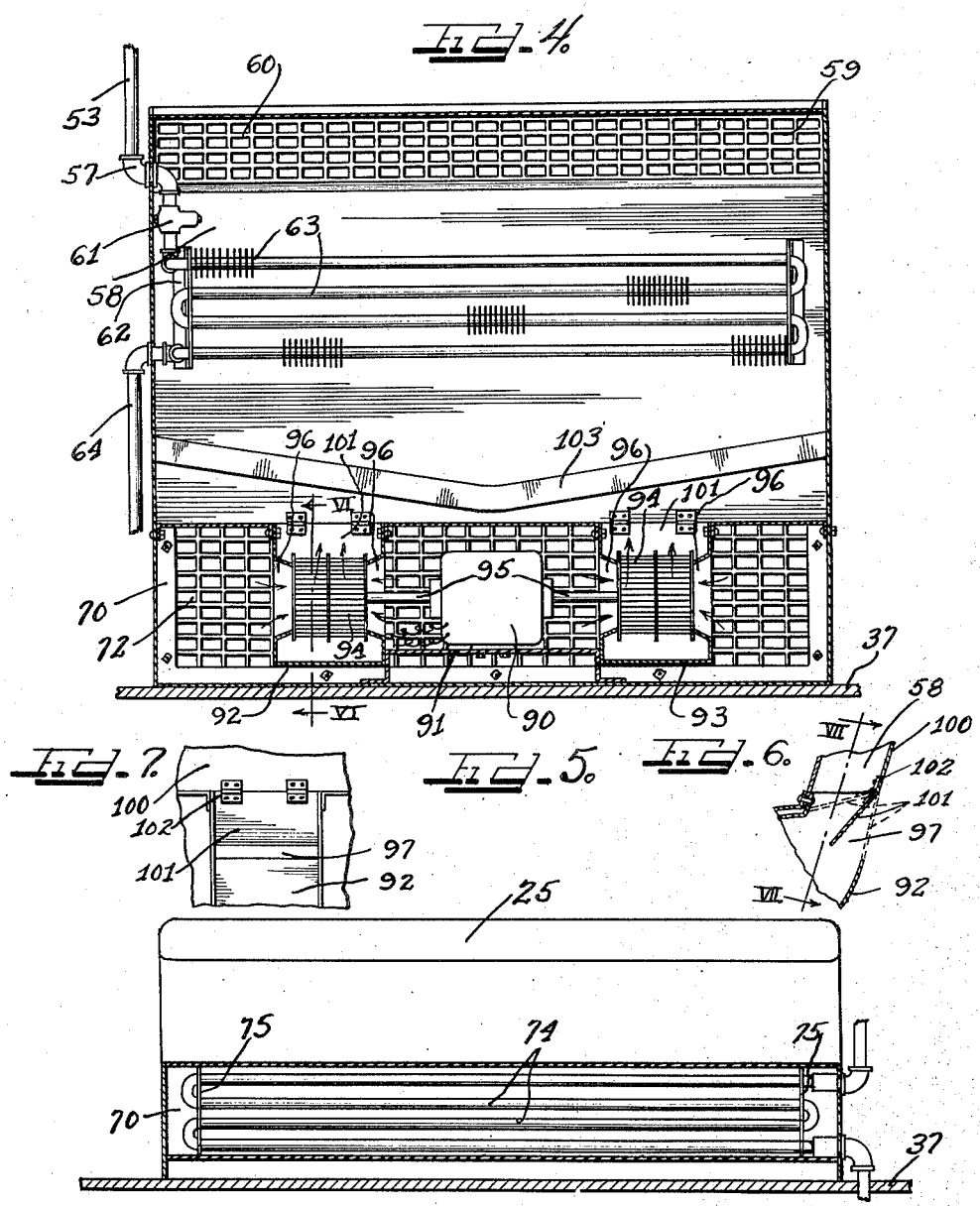

Patented Nov. 1, 1938

2,134,724

UNITED STATES PATENT OFFICE 2,134,724

HEATING AND COOLING SYSTEM FOR VEHICLES

Luther C. McClanahan and Frederick G. Riedel, Buffalo, N. Y., assignors to Houde Engineering Corporation, Buffalo, N. Y., a corporation of New York Application February 29, 1936, Serial No. 66,344

16 Claims. (Cl. 257—7)

This invention relates to an all weather air-conditioning system for vehicles.

More specifically this invention relates to an air-conditioning system for self-propelled vehicles capable of heating or cooling the passenger space within the vehicle by energy supplied from the vehicle motor.

The system of this invention is adapted to be mounted under and in back of the passenger seats in a multi-seat vehicle such as, for example, a bus, street car, or railway coach. The system delivers heated air along the bottom or floor of the passenger space where it may rise to efficiently heat the entire space. When the system is operated to cool the passenger space, the same air-propelling means are used as were used for heating the space but the cooled air is delivered into the space at a higher level where it may diffuse with the air in the space and descend to the passengers in the vehicle.

Air inlets and outlets of regulated capacities are preferably provided in the vehicle to make possible a circulation of controlled amounts of fresh air through the system together with a re-circulation of air already in the passenger space.

It is then an object of this invention to provide an all-weather air-conditioning system for closed vehicles.

It is a further object of this invention to provide a heating and cooling system for closed vehicles wherein heated air is discharged along the floor of the vehicle in cold weather and cold air is discharged at a higher level in the vehicle in hot weather.

Another object of this invention is to provide heating and cooling mechanisms in some of the seats of passenger vehicles.

A specific object of this invention is to provide an air-conditioning system for busses having separate heating and cooling units mounted in the seat construction of the bus.

A further object of this invention is to provide heating and cooling systems for self-propelled passenger vehicles wherein the motor of the vehicle drives a compressor pump for the cooling phase of the system and the exhaust gases from the vehicle are used to heat the air in the vehicle when the system is operating under its heating phase.

Another object of this invention is to provide a simplified heating and cooling unit construction for seat installation wherein air is circulated under the seat over heating coils and discharged along the floor of the vehicle or is directed into a vertical passageway without being heated for contact with a cooling means wherein it is cooled and discharged at a higher level than the level used for discharging the heated air.

Other and further objects of this invention will become apparent from the following detailed description of the annexed sheets of drawings which disclose preferred embodiments of the invention.

While the heating and cooling system of this invention will be specifically hereinafter described as applied to an automobile bus it should be understood, of course, that the system can be incorporated in other types of vehicles without department from the scope of this invention.

On the drawings:

Figure 1 is a diagrammatic side elevational view of a motor bus having a heating and cooling system according to this invention installed therein.

Figure 2 is a fragmentary plan view of one of the top ventilators of the bus shown in Figure 1.

Figure 3 is an enlarged broken cross-sectional view with parts in elevation, taken through the front portion of the bus shown in Figure 1 showing the refrigerant condenser mounted on the roof of the bus and the duct construction in the seats for air-conditioning systems of this invention.

Figure 4 is a cross-sectional view, with parts shown in elevation, taken substantially along the line IV—IV of Figure 3.

Figure 5 is a cross-sectional view, with parts in elevation, taken substantially along the line V—V of Figure 3.

Figure 6 is a fragmentary cross-sectional view taken along the line VI—VI of Figure 4.

Figure 7 is an elevational view of the damper construction taken along the line VII—VII of Figure 6.

Figure 8 is a fragmentary vertical cross-sectional view of an alternative form of cold air outlet for seat constructions according to this invention.

As shown on the drawings:

In Figure 1 the reference numeral 10 indicates generally a passenger bus having a closed passenger space 11 and a motor compartment 12 separated therefrom for containing an internal combustion engine 13 to drive the bus. The engine 13 has the usual fan 14 rotatably secured thereon for drawing air through the radiator 15. The fan 14 is driven from the crank shaft (not shown) of the motor 13 by a belt 16. The fan 14 in turn drives a second belt 16a which second belt rotates an auxiliary shaft 17 carried on the motor block 13. A centrifugal type governor clutch 18 is driven by the auxiliary shaft 17 through a belt 19. Suitable governor clutches 18 are more fully described and claimed in the copending applications of Ralph F. Peo, Serial No. 24,307, filed May 31, 1935, now Patent 2,107,341, issued February 8, 1938, entitled "Governor clutch", and Ralph F. Peo and William D. Drysdale, Serial No. 59,500, now Patent No. 2,099,750, issued Nov. 23, 1937, entitled "Governor clutch drive mechanism and support". The clutch 18 includes an automatic centrifugal throw-out (not shown) for disengaging the clutch when it is driven beyond a predetermined speed.

The governor clutch 18 drives the rotor of a compressor pump 20 in the refrigerating cycle of the system.

The clutch 18 may be manually disengaged by means of a Bowden wire 21 extending from the clutch to the dashboard 22 of the bus 10 where it terminates in a knob or handle 23 within convenient reach of the driver of the bus.

The passenger space 11 of the bus 10 contains a driver's seat 24 and a plurality of passenger seats 25 to 32 inclusive. Obviously any number of seats can be installed depending upon the size of the bus since the system of this invention is readily adapted for all sizes of busses.

Air inlet openings 33, 34, 35, and 36 are provided near the floor 37 of the passenger space 11 in front of the odd numbered seats 25, 27, 29, and 31 therein. The air inlet openings can be individually regulated to any desired effective size by means of rotatable sectors 38 provided thereover as is customary on many ventilating devices. The sector members 38 can be manually turned singularly or in groups if desired by a simple control wire or rod (not shown).

If desired the openings 33 to 36 can each have a duct such as 33a for conveying all of the air entering therethrough into passageways formed under the odd numbered seats as will be hereinafter described. The openings 33 to 36 could be placed directly alongside of the passageways so that ducts such as 33a would not extend in front of the seats.

The roof 39 of the bus 10 has a plurality of ventilators 40 formed therein with openings 41 directed toward the rear of the bus so as to draw air from the passenger space 11. The members 40 therefore act as outlets for stale air within the passenger compartment 11. The amount of air discharged through the openings 41 can be controlled by shutters 42 disposed within the members 40.

The roof 39 also carries a stream-lined condenser casing 43 near the front end thereof. The casing 43 has mounted therein a bank of condenser pipes or coils 44 extending across the width of the casing and secured at their ends in plates such as 45 (Figure 3) within the casing. The front end of the casing 43 is open and provided with louvers 46 directing any air which enters the casing over the coils 44 therein. The upper portion of the rear of the casing 43 is also open and has a plurality of louvers 47 therein to protect the condenser coils 44 from any rays of the sun and also to direct air from the inside of the casing toward the rear of the bus.

A refrigerant such as methylene chloride ($CH_2Cl_2$) is compressed in the pump 20 and pumped upwards through the tube 50 (Figures 1 and 3) into the header 51 of the condenser tubes 44. The compressed refrigerant is then condensed by air flowing through the condenser casing 43 and flows from the coils 44 into a receiver 52 located within the passenger compartment 11 of the bus under the roof 39.

From the receiver 52 the condensed refrigerant flows by gravity through tubes or pipes 53, 54, 55, and 56 extending downwardly through the side walls of the bus into couplings 57 (Figures 3 and 4) located on the sides of the odd numbered seats 25, 27, 29, and 31 respectively.

These odd numbered seats 25, 27, 29, and 31 have passageways 58 formed in the backs thereof terminating in discharge openings 59 located near the top of the seats as shown in Figures 3 and 4. The openings 59 are preferably covered with a grille or screen 60.

The passageways 58 extend across the full width of the back of the seats as shown in Figure 4.

An expansion valve 61 is mounted in each passageway 58 beneath the discharge opening 59 thereof in communication with the couplings 57 for receiving refrigerant from the tubes 53 to 56 inclusive leading from the receiver.

The refrigerant is expanded through the expansion valve 61 into the low side of the refrigerating system and flows through evaporator units 62 comprising a bank of finned heat exchanger tubes 63 as shown in Figures 3 and 4.

The expanded and spent refrigerant is then drawn through tubes 64, 65, 66, and 67 into a vacuum line 68 communicating with the compressor pump 20. The compressor pump 20 therefore maintains the low side of the system under reduced pressures and compresses the refrigerant from this low side for flowing upwards into the condenser where it is condensed to a liquefied form and collected for use as needed in the evaporator units 62 by the receiver 52.

The odd numbered seats 25, 27, 29, and 31 are each provided with horizontal passageways 70 extending under the seats from the front to the rear thereof and preferably provided with screens or grilles 71 and 72 respectively at the front and rear extremities thereof. (Figure 3.)

A filter 73 is preferably mounted across the passageways 70 behind the front grille 71 thereof for removing dirt from air passing through the passageway 70.

Behind the filter 73 there is mounted within the passageways 70 a bank of tubes or pipes 74 held at their ends in plates 75. The tubes 74 serve as the heating means for the air-conditioning system and operate as will now be described.

As shown in Figure 1 the exhaust pipe 80 for conveying the hot exhaust gases from the internal combustion engine 13 of the bus 10 holds a coiled tube 81 wound therearound and disposed within a casing 81a. Water is supplied to the coiled tube 81 from a tank or reservoir 82, carried under the floor 37 of the bus, through a pipe 83 whenever the valve 84 in the pipe line 83 is open. The heat of the exhaust gases passing through the pipe 80 heats the water in the coil 81 to generate steam or hot water which is flowed into a pipe 85 communicating through branch pipes with each set of heating coils 74. The coils 74 are thus heated by the steam or hot water flowing therethrough and the spent steam or hot water is fed into a return line 86 back to the reservoir 82.

An electric motor 90 is mounted in the central portion of each passageway 70 near the back end thereof on a bracket 91 (Figure 4) secured to the bottom wall of the passageway.

The centrifugal or housed type blowers 92 and 93 are mounted on each side of the motor 90 as shown in Figure 4. Each blower 92 and 93 has a rotor or wheel 94 driven by the motor 90 through shafts 95 extending from each side of motor 90.

As shown in Figure 4 the casings of the blowers 92 and 93 are provided with central openings 96 on each side thereof. The rotors 94 of the blowers draw air through the openings 96 and discharge the air through an opening 97 provided in the top portion of the blower casing (Figure 6). The rear wall 100 of each passageway 58 carries a pair of dampers 101 at the bottom thereof. The dampers 101 are pivoted on hinges 102 secured to the bottom of the passageway wall 100.

The dampers 101 are adapted to be swung across the openings 97 of the blowers 92 and 93 for directing air issuing from the blowers either through the grille 72 at the end of the passageway 70 or into the passageway 58. Thus as shown in Figure 3 when the damper 101 is positioned as indicated in solid lines, air from the blower 92 is directed into the passageway 58. However, when the damper 101 is swung over to the position shown in dotted lines air from the blower 92 is directed through the grille 72 at the rear of the passageway 70.

Since the passageways 70 and 58 communicate with each other only through the blowers 92 and 93, the dampers 101 can direct all of the air flowing through the passageway 70 either through the grille 72 at the end thereof or upward through the passageway 58 over the coils 63 and out through the upper grille 60. As shown in Figure 4, the top wall of the passageway 70 closes the space between the blowers and from each blower to the side walls of the passageway.

A moisture collecting trough 103 is secured to the back wall 100 of the passageway 58 under the coils 63 in the passageway. As shown in Figure 4 the trough 103 is V-shaped with its lower portion in the center of the passageway 58. Any moisture dripping from the cooling coils 53 is collected in the trough 103 and flows by gravity into the lower central portion thereof from which it is drained through a drain pipe such as 104 (Figure 3) extending through the floor 37 of the bus to remove the condensed moisture out of the passenger space 11.

In Figure 8 the seat 25a thereof has a passageway 58a at the back thereof similar to the passageway 58 described in connection with the seat 25. However while the passageway 58 has a discharge opening 59 at the rear of the seat, the passageway 58a has a discharge opening 59a at the top thereof so that air issuing from the passageway 58a, instead of being directed backward toward the even numbered seats is directed upward in the passenger space 11 and diffuses with the other air in the space for cooling the passengers and the space.

The system of this invention operates as follows:

Assuming that it is desired to heat the inside of the bus 10, the operator disconnects the governor clutch 18 by moving the knob 23 on the end of the Bowden wire 21 so that the refrigerating phase of the system will not be actuated.

The reservoir 82 under the bus 10 is then supplied the desired amount of water and the valve 84 is opened to permit water from the reservoir to flow through the heating coils 81 surrounding the exhaust pipe 80.

The dampers 101 are then manually raised in each of the odd numbered seats 25, 27, 29, and 31 to shut off the passageways 58 therein and direct air from the blowers 92 and 93 through the grille 72.

When the motor 13 of the bus is running the exhaust gases flowing through the pipe 80 heat the water in the coil 81 to generate hot water or steam which flows into the heating coils 74 disposed in the passageways 70 of the odd numbered seats.

The motors 90 in these passageways 70 are then energized to drive the blowers 92 and 93. Air is thus drawn through the grilles 71 in the front of each odd numbered seat, through the filter 73 and over the heating coils 74 where it is warmed to the proper degree. The heated air is then discharged by the blowers 92 and 93 laterally through the grilles 72 along the floor of the bus where it rises and circulates throughout the occupied area 11 of the bus. During the heating of the bus the inlet openings 33, 34, 35, and 36 in front of each of the odd numbered seats are set to supply as much fresh air as is desired in the bus and if the outside weather is very cold these openings can be completely closed since sufficient fresh air will enter the bus by infiltration through cracks and crevices thereof.

The exhaust openings 41 in the roof of the bus can likewise be set to the desired capacity.

It should be understood that other heating means can be used in place of the hot water or steam generator illustrated since obviously the exhaust gases from the motor could be directly circulated through heating coils such as 74 located in the horizontal passageways 70 or electric resistance elements could be heated by current supplied from a generator or batteries carried by the bus. Hot water from the radiator 15 could likewise be circulated through the coils 74.

When it is desired to cool the passenger space 11 of the bus, the valve 84 is closed to prevent circulation of water to the coils 81. If desired the reservoir 82 can be drained free from water by means of a drain cock 82a located in the bottom thereof.

The dampers 101 are then manually moved to direct the air from the blowers 92 and 93 into the passageways 58 by lowering the dampers to the position shown in full lines in Figure 3.

The control knob 23 for the governor clutch 18 is then moved so that the clutch will be engaged with the motor 13. When the motor 13 is running the compressor pump 20 is thus driven through the governor clutch 18 for evacuating the low side of the refrigerating system and for pumping compressed refrigerant into the condenser tubes 44.

During forward movement of the bus air is circulated through the condenser casing 43 for cooling the refrigerant flowing through the coils 44 so that the refrigerant is condensed and collected in the receiver 52 which is mounted within the passenger space 11 of the bus. The condensed refrigerant then flows by gravity into the evaporator units 62 carried in each passageway 58 of the odd numbered seats 25, 27, 29 and 31 respectively. The refrigerant is allowed to expand through the evaporator units in the coils 63 thereof and air blown from the fans 92 and 93 upward through the passageways 58 must pass over these coils in extended contact therewith whereupon it becomes cooled to the desired degree. During the cooling of this air moisture is removed therefrom and collects in the troughs 103 below the evaporator units from which it is drained through pipes 104 outside of the occupied area of the bus.

The fresh air inlets 33, 34, 35, and 36 are opened to a desired degree and air is drawn from these inlets into the passageways 70 for admixture with recirculated air from the interior of the bus. The foul air escapes through the openings 41 in the roof of the bus as described above.

It should be understood that this invention provides for the discharge of heated air along the floor of the passenger space of a vehicle where it can rise due to its lighter weight. The system at the same time provides for the discharging of cooled air at a high level in the occupied area of the vehicle where it can descend upon the passengers in the vehicle.

The discharge openings 59 of the odd numbered seats can be provided with directing fins (not shown) to direct the cooled air into the faces of the occupants of the even numbered seats and over their heads to the occupants of the odd numbered seats or can be directed upwardly above the seats as shown in Figure 8 for gradual descent and circulation throughout the entire occupied space 11.

Under some weather conditions it might be desirable to first heat the air and then cool the heated air before delivering it to the occupied area of the vehicle. The system can obviously be operated to heat the heating coils and cool the cooling coils at the same time to meet the demands of heating the air before cooling.

In addition the position of the heating and cooling coils can be interchanged in the seats to permit a tempering of cooled air. Thus air passing through the horizontal passageway can be cooled below the dewpoint thereof to condense moisture therefrom. At this temperature however the air might be too cold for circulation into the vehicle so it can then be passed through the vertical passageway over heating coils to raise its temperature. This operation of the system would be desirable where moderate temperatures exist with very high relative humidities.

The alternate arrangement of seats equipped with cooling and heating mechanisms is illustrated for purposes of convenience only since it is obvious that these mechanisms could be placed in every seat or in every third or fourth seat as desired.

We are aware that many changes may be made and numerous details of construction may be varied through a wide range without departing from the principles of this invention and we, therefore, do not purpose limiting the patent granted thereon otherwise than necessitated by the prior art.

We claim as our invention:

1. An air-conditioning system for passenger vehicles comprising means defining an open ended air passageway along the bottom of the passenger space of the vehicle, means defining an upwardly extending air passageway intersecting with said first-mentioned passageway and having a discharge opening at the top end thereof, air propelling means for drawing air into the first-mentioned passageway, a damper for directing air from the propelling means out of an end of the first-mentioned passageway or into the upwardly extending passageway, heating elements in the open ended passageway and cooling elements in the upwardly extending passageway whereby heated air can be discharged along the bottom of the passenger space when the heating elements are operated and cooled air can be discharged at a higher level in the passenger space when the cooling elements are operated.

2. An air-conditioning system for vehicles having a plurality of passenger seats therein comprising means defining open ended horizontal passageways under some of the seats, means defining secondary passageways along the backs of said seats having discharge openings at the top end thereof, blowers for drawing air into the horizontal passageways, dampers for directing air from the blowers either out of the rear end of the horizontal passageways or into the secondary passageways, heating elements in said horizontal passageways and cooling elements in said secondary passageways, whereby heated air can be discharged along the floor of the vehicle for rising throughout the vehicle interior when the heating elements are operated and cooled air is discharged at a higher level in the vehicle for circulation over the passengers therein when the cooling elements are operated.

3. An air-conditioning system for passenger vehicles comprising air inlets along the bottom of the passenger space of the vehicle, air outlets along the top of said passenger space, means defining open ended air passageways along the bottom of said space adapted to receive air from the space and from the inlets, heating elements in said passageways, means defining secondary passageways extending upwardly from the first-mentioned passageways near the ends thereof, cooling elements in said secondary passageways, air propelling means in said passageways and dampers adapted to direct air propelled by said means either out of the rear open ends of said first-mentioned passageways or into the secondary passageways whereby heated air can be discharged along the bottom of the passenger space when the heating elements are operated and cooled air is discharged at a higher level in the space when the cooling elements are operated.

4. A ventilating system for motor-propelled passenger vehicles comprising in combination with a closed vehicle having a plurality of seats for passengers therein, air inlets near the floor of said vehicle adjacent some of said seats, air outlets at the top of said vehicle, heating and cooling means carried by some of said seats, means actuated by the motor of the vehicle to supply heating or cooling effects to said means carried by the seats and fans for circulating air from said inlets and from said space over the heating or cooling means.

5. An air-conditioning system for self-propelled vehicles comprising in combination with a vehicle having a closed passenger space with a plurality of seats therein, intersecting ducts formed under and along the backs of some of the seats, the ducts under the seats having openings at the front and rear of the seats and the ducts along the backs of the seats having openings along the tops of the seats, heating coils in said ducts under the seats, cooling coils in the ducts along the backs of the seats, means actuated by the motor of the vehicle to supply heating or cooling effects to said coils, fans in the ducts under the seats and means for directing air propelled by the fans out of the rear openings of said ducts or into the ducts extending along the backs of the seats whereby heated air is discharged along the bottom of the passenger space when the heating coils are operated and cooled air is discharged at a higher level into the passenger space when the cooling coils are operated.

6. In combination with a self-propelled multi-passenger vehicle having a closed passenger space with a plurality of seats therein and a motor compartment separated therefrom, a motor in said compartment, an exhaust pipe for said motor, a refrigerant compressor driven by said motor, a refrigerant condenser on the roof of said vehicle for receiving refrigerant from the compressor, air ducts formed under and along the backs of some of the seats in the passenger space, an evaporator unit in the ducts along the backs of the seats for receiving refrigerant from the condenser, tubes for drawing spent refrigerant from the evaporators back to the compressor, coils in the ducts below the seats adapted to be heated by said exhaust pipe, fans for drawing air through said ducts and a damper for directing heated air out of the ducts under the seats along the floor of the vehicle when it is desired to heat the vehicle interior and for directing the air to the ducts along the backs of the seats to pass over the evaporator units therein when it is desired to cool the vehicle.

7. An air-conditioning system for a passenger vehicle comprising a closed passenger space to be heated or cooled depending upon the temperature therein, a horizontal duct extending along the floor of said space having inlet and discharge openings communicating with the space, a vertical duct intersecting with said horizontal duct having a discharge opening at the top end thereof, cooling coils in said vertical duct, heating coils in said horizontal duct, a damper for directing air from the horizontal duct into the vertical duct or out of the discharge opening of the horizontal duct, fans for propelling air through said ducts and manually controlled means for supplying heating or cooling effects to said heating and cooling coils in the ducts whereby heated air can be discharged from the horizontal duct along the floor of said space or cooled air can be discharged from the vertical duct at a higher level into said space.

8. An air-conditioning system for a motor-propelled bus having a closed interior with a plurality of passenger seats therein, a compressor pump driven by the motor of said bus, a condenser mounted above the roof of said bus for receiving compressed refrigerant from the compressor, a receiver mounted within the vehicle interior for receiving condensed refrigerant from the condenser, evaporator units mounted on the backs of some of the seats in the interior of the bus, tubes for supplying refrigerant from the receiver to said evaporator units, additional tubes for conveying spent refrigerant from the evaporator units back to the compressor and fans for blowing air over said evaporator units to cool the interior of the bus.

9. An air-conditioning system for motor busses comprising in combination with a closed self-propelled bus having a plurality of passenger seats in the passenger space thereof and an internal combustion engine in the motor compartment thereof, a compressor pump driven by said internal combustion engine in said motor compartment, a refrigerant condenser mounted on the roof of the passenger compartment, a receiver tank for receiving condensed refrigerant from the condenser mounted within the passenger compartment, evaporator units carried by the backs of some of the seats in said passenger compartment, tubes for supplying condensed refrigerant from said receivers to said evaporator units, tubes for removing spent refrigerant from the evaporator units back to the compressor pump, heating coils positioned under some of said seats, means actuated by the motor of the vehicle for heating said coils, fans for drawing air over said coils and said evaporator units, air inlets in front of some of said seats along the floor of said passenger compartment, means to regulate the effective size of said inlets, air outlets in the roof of said passenger compartment, shutters for regulating the effective size of said outlets and means for directing the air propelled over said heating coils either along the floor of said passenger space or upwards over the evaporator units so that heated air is circulated along the floor of the passenger compartment and cooled air is circulated at a higher level in the passenger compartment.

10. In combination with a vehicle to be air-conditioned, a passenger seat therein, means defining a horizontal passageway extending under the seat having openings at the front and rear of the seat, an upturned passageway formed along the back of the seat having a discharge opening at the top thereof, a blower in said horizontal passageway having a discharge outlet communicating with the rear opening of the horizontal passageway and with the upturned passageway and means for directing air from the blower through the rear opening or into said upturned passageway.

11. In combination with an air-conditioning system for passenger vehicles, a seat having ducts defining intersecting passageways under the seat and along the back of the seat, the passageway under the seat having open ends and the passageway along the back of the seat having a discharge opening at the top thereof, a blower for drawing air through the open ended passageway and a damper for directing said air either out of an end of the open ended passageway or into the passageway along the back of the seat.

12. In combination with an air-conditioning system for vehicles, a passenger seat having a horizontal duct thereunder with openings at the front and rear of the seat and a communicating upturned duct along the back thereof, said upturned duct having a discharge opening at the top thereof, a blower for propelling air through said horizontal passageway, and a damper for directing propelled air out of the rear opening of the horizontal passageway or into the upturned passageway.

13. An air-conditioning system for self-propelled passenger vehicles, comprising in combination with a closed vehicle having a plurality of seats for passengers therein, air inlets near the floor of said vehicle adjacent said seats, means for regulating the effective size of said inlets, air outlets at the top of said vehicle, shutters for controlling the capacity of said outlets, heating and cooling means carried by some of said seats, means actuated by the motor of the vehicle for supplying heating or cooling effects to said means carried by the seats and blowers for circulating air from said inlets over the heating or cooling means.

14. In combination with an air-conditioning system for passenger vehicles, a seat construction comprising a framework defining a seat, a horizontal duct extending along the bottom of said frame from the front to the rear of the seat, an upturned duct formed along the back of said frame in communication with the horizontal duct, a blower mounted in said horizontal duct, an electric motor for driving said blower, a damper for directing air from said blower out of one end of the horizontal duct or into the upturned duct, heating coils in said horizontal duct, and cooling coils in said upturned duct whereby heated air can be discharged from the bottom of the seat and cooled air can be discharged from the top of the seat.

15. In an air-conditioning system for passenger vehicles, a passenger seat having a horizontal open ended duct extending thereunder and a vertical duct extending along the back of the seat communicating with the horizontal duct, a blower having air intakes in the sides thereof in the horizontal duct and outlets communicating with an open end of the horizontal duct and with the vertical duct, and a damper cooperating with the blower outlets to direct air issuing therefrom either into the vertical duct or out of the end of the horizontal duct.

16. In an air-conditioning system for passenger vehicles, a passenger seat having a duct extending along the back thereof with a discharge opening at the top of the seat, cooling coils in said duct, a trough depending from a wall of said duct for collecting moisture as it drips from the cooling coils and a drain pipe for removing the moisture collected in the trough.

LUTHER C. McCLANAHAN.
FREDERICK G. RIEDEL.